June 9, 1925.  1,541,453
C. S. WATKINS
DEMOUNTABLE RIM AND WHEEL FOR AUTOMOBILES AND OTHER VEHICLES
Original Filed Dec. 20, 1922    2 Sheets-Sheet 1

WITNESSES

Inventor
Clayton Stuart Watkins

Patented June 9, 1925.

1,541,453

UNITED STATES PATENT OFFICE.

CLAYTON STUART WATKINS, OF WICHITA FALLS, TEXAS.

DEMOUNTABLE RIM AND WHEEL FOR AUTOMOBILES AND OTHER VEHICLES.

Application filed December 20, 1922, Serial No. 607,931. Renewed October 27, 1924.

*To all whom it may concern:*

Be it known that I, CLAYTON STUART WATKINS, a citizen of the United States, residing at Wichita Falls, in the county of Wichita and State of Texas, have invented a new and useful Demountable Rim and Wheel for Automobiles and Other Vehicles, of which the following is a specification.

The invention comprehends a wheel of any suitable design provided with the necessary attachments to comprise the mechanism constituting the features of this invention; also a tire rim of any suitable design having the necessary lugs and mechanism arranged thereon to provide a method of removing the tire rim from said wheel by turning one gear which disengages a certain number of slanting lugs and permits the rim to be quickly removed.

Another object of the invention is to provide a device of this nature, comprising a wheel of any suitable design; also a tire rim of any suitable design having a series of slanting lugs arranged therein; also a series of supporting rollers which provide means of allowing the tire rim to be easily turned. A gear is arranged between the tire rim and felloe band of said wheel, which is associated with teeth on said tire rim and said felloe band. A shaft is arranged between said felloe band and said tire rim to support the aforesaid gear. A square head is arranged on one end of the aforesaid shaft, having a coil spring which holds the square head against a fixed flange of the aforementioned felloe band, thus providing a locking device.

Another object of the invention is to provide a device of this nature which is very simple and practical and can be manufactured at a very nominal cost.

The nature and advantages of the invention will be better understood when the following detailed description is read in connection with the accompanying drawing. The invention resides in the construction, combination and arrangement of parts as claimed.

In the drawing forming a part of this application, the various parts are referred to by numbers.

Figure 3:
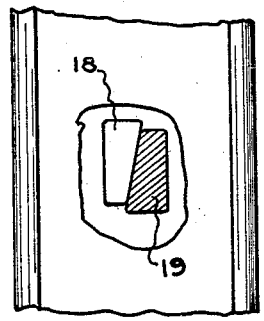
Figure 3 is a view showing the arrangement of the slanting lugs.
Figure 1:
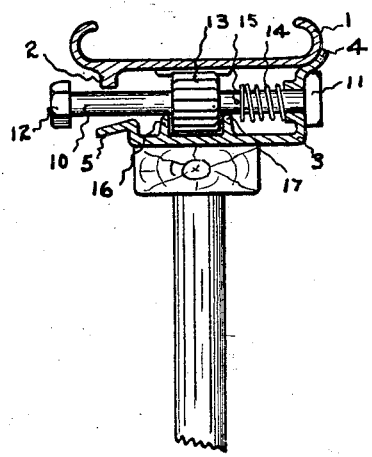
Figure 1 is a sectional view showing the gear and locking device.
Figure 2:
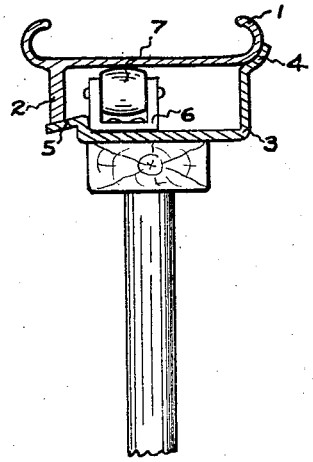
Figure 2 is a sectional view showing the arrangement of the supporting rollers.
Figure 4:
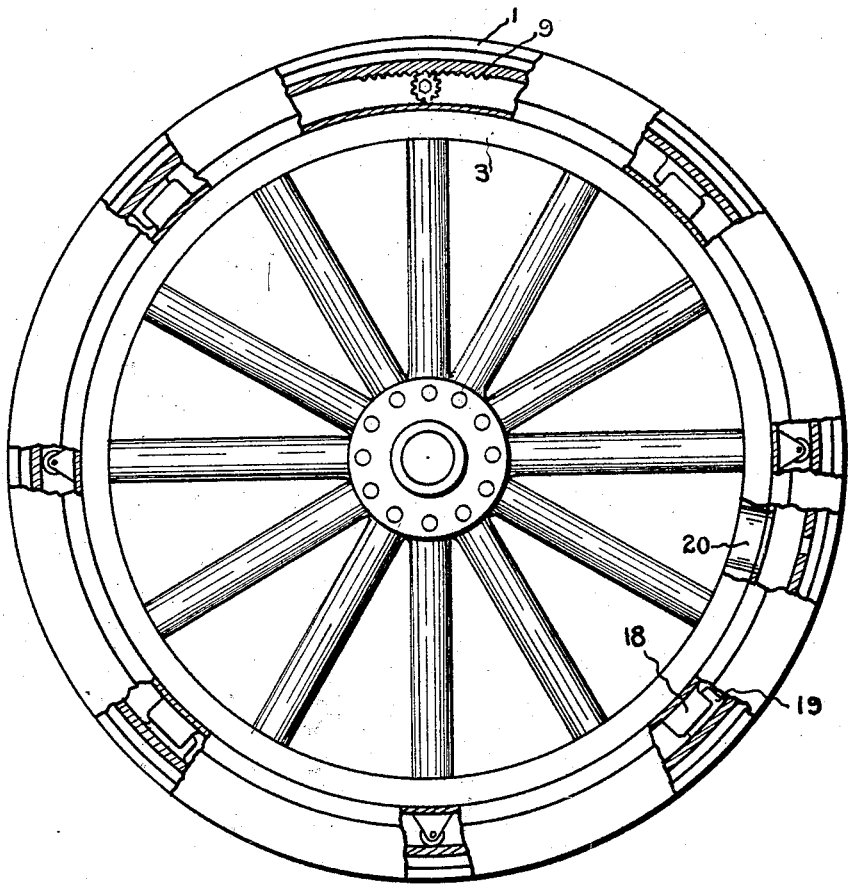
Figure 4 is a side view sectioned at various places to show the construction and general assembly of the device.

1 is a tire rim of any suitable design, having a flange 2 arranged thereon, forming a part thereof. 3 is a felloe band mounted on a wheel. The felloe band 3 is provided with a flange 4 on one side to support the tire rim 1. The felloe band 3 is also provided with a flange 5 to support the flange 2 of the tire rim. 6 is a bracket or frame which holds the supporting rollers 7. The tire rim 1 is provided with a certain number of teeth as illustrated at 9 in Figure 4. 10 is a shaft arranged transversely in the felloe band 3, as illustrated in Figure 1. 11 is a square head on one end of the shaft 10, forming a part thereof. 12 is a hexagon nut keyed on the other end of the shaft 10. 13 is a sliding gear keyed on the shaft 10 and is associated with the teeth on the tire rim 1, as illustrated at 9. 14 is a coil spring arranged on the shaft 10 between one side of the felloe band 3 and a pin 15 in the shaft 10. 16 and 17 are guides arranged on the felloe band 3, as illustrated in Figure 1, and hold the gear 13 in the proper place. 18 is a slanting lug arranged on the felloe band 3. 19 is a slanting lug arranged on the tire rim 1, associated with the slanting lug 18. As shown in Fig. 3, lugs 18 and 19 are arranged in pairs at regular intervals. A slot is provided in the felloe band 3, as illustrated at 20, in Figure 4, for the valve stem of a tire.

When in position for use this invention serves as a very efficient demountable rim and wheel. When it is desired to remove the tire rim 1 from the felloe band 3 a socket wrench is placed on the hexagon nut 12, which is keyed on the shaft 10 and by pressing in on the shaft 10 the square head 11 will project beyond the flange 4 of the felloe band 3, allowing the shaft and gear to be turned in either direction. By turning the gear in a certain direction the slanting lugs 18 and 19 will become disengaged, thus allowing the rim to be easily and quickly removed. When it is desired to apply the tire rim 1 to the felloe band 3 the rim 1 is placed over the felloe band 3 and is supported by the rollers 7. In placing the rim 1 on the felloe band 3 the teeth 9 arranged on the rim must be in mesh with the gear 13. Then by pressing the shaft 10 in and releasing the square head 11 from the flange 4 of the felloe band 3 the gear 13 may be turned in a certain direction, which will engage the lugs 18 and 19 and press the rim 1 against the flange 4 and the flange 2 against the flange 5, thus binding the rim 1 securely to the felloe band 3. The rim 1 is prevented from coming loose when the spring 14 draws the square head 11 of the shaft 10 in contact with the flange 4 of the felloe band 3.

While it is believed from the foregoing description the nature and advantages of the device will be readily apparent, I desire to have it understood that I do not limit myself to what is herein shown and described, and that such changes may be resorted to, when desired, as fall within the scope of what is herein claimed.

What I claim is:

1. The combination with a vehicle wheel comprising a felloe provided with side flanges, one of said flanges being inclined outwardly and the other flange being shaped to support a tire rim, a tire rim having a depending flange the edge of which is beveled to correspond with the inclined flange upon said felloe, said felloe and rim having cooperating locking wedges provided with co-acting wedging faces, and means for rotating said rim relative to said felloe whereby to bring said wedges into locking relation, of a plurality of U-shaped brackets upon said felloe, and rollers in said brackets to support and guide said tire rim.

2. In combination in a vehicle wheel, a felloe band of channel form including a base and side flanges, one of said flanges having an inclined extension directed outwardly with respect to the base and inwardly with respect to the hub of the wheel, the other flange being curved at its outer portion to fit and support a tire rim, said tire rim being provided with a flange directed toward and bearing against the aforesaid inclined extension of the flange on said felloe band, the edge of said rim flange being suitably beveled to correspond with the inclination of said extension, co-operating locking lugs arranged on the felloe band and rim respectively, said lugs having co-acting wedging faces directed at a slight angle to the plane of the wheel, a toothed rack formed on the inner face of said rim, a rotatable gear carrying shaft journalled in the flanges of said felloe band and a gear keyed to said shaft and adapted for slight longitudinal movement thereon, limiting guide flanges for said gear formed on said felloe band intermediate the outer flanges, said gear meshing with the teeth on said rack, a squared nut on one end of said shaft keyed thereto whereby the same may be rotated for bringing the aforesaid wedges into and out of co-operative relation, a squared head upon the opposite end of said shaft keyed thereto, a coiled spring on said shaft, one end thereof engaging a vertical flange of said felloe band the other end thereof engaging suitable abutment provided on said shaft and normally holding said squared head of said shaft against a projection and the rim engaging and supporting flange of said felloe band whereby rotation of said gear shaft is prevented when in place.

3. An automobile wheel comprising, in combination, a channelled felloe band having side flanges on both sides thereof and arranged at an angle to the base of the band, a tire rim having a flange on one side thereof associated with a corresponding flange on the felloe band, a toothed rack on said rim facing the felloe band, a shaft arranged transversely of said felloe band and journalled in one of the upstanding flanges thereof, a gear keyed to said shaft and movable longitudinally thereof, said gear meshing with the teeth of said rack, one end of the shaft having a square head arranged thereon and a nut keyed on the other end thereof, a coil spring on said shaft bearing at one end against an upstanding flange of the felloe band whereby said head is normally held in contact with said flange thereby locking said gear shaft against rotation, a plurality of U-shaped brackets upon said felloe band, rollers carried in said brackets and adapted to support said tire rim, a plurality of pairs of co-operating lugs arranged upon said felloe band and rim, said lugs having co-acting wedging faces on one side thereof, the faces being set at an angle to the central plane of said wheel, said lugs being adapted to force the tire rim against said felloe band when said gear shaft is rotated in one direction, and to release the tire rim when the gear shaft is rotated in the opposite direction.

CLAYTON STUART WATKINS.

Witnesses:
C. B. TONEY, Jr.,
FRED L. BRONSON.